United States Patent [19]

Rice

[11] Patent Number: 4,903,341
[45] Date of Patent: Feb. 20, 1990

[54] SEMICONDUCTOR OPTICAL HETERODYNE DETECTOR

[75] Inventor: Robert R. Rice, Florissant, Mo.

[73] Assignee: McDonnell Douglas Corporation, St. Louis, Mo.

[21] Appl. No.: 138,211

[22] Filed: Dec. 28, 1987

[51] Int. Cl.$^4$ .............................................. H04B 9/00
[52] U.S. Cl. ..................................... 455/619; 357/16; 357/17; 455/612
[58] Field of Search ................. 356/5; 357/16, 17, 19, 357/23.14, 33; 372/12, 38, 22, 23, 27, 33; 329/153, 122; 455/606, 607, 609, 610, 611, 612, 613, 615, 617, 618, 619

[56] References Cited

U.S. PATENT DOCUMENTS

| | | | |
|---|---|---|---|
| 4,156,209 | 5/1979 | Herbst | 372/12 |
| 4,327,962 | 5/1982 | Redman | 356/350 |
| 4,329,664 | 5/1982 | Javan | 372/32 |
| 4,405,230 | 9/1983 | Tew | 372/32 |
| 4,468,773 | 8/1984 | Seaton | 372/32 |
| 4,503,541 | 3/1985 | Weller | 372/19 |

Primary Examiner—Robert L. Griffin
Assistant Examiner—Leslie Van Beek
Attorney, Agent, or Firm—Benjamin Hudson, Jr.; George W. Finch; J. P. Scholl

[57] ABSTRACT

There is provided by this invention an optical heterodyning device comprised of a semiconductor heterostructure having a forward biased electrode connected thereto for optically mixing an input signal frequency with a local oscillating frequency in the separate confined laser cavity and a reverse biase electrode connected thereto for detecting the intermediate frequency produced. The local oscillator provides preamplification in the laser cavity and can be effectively phase locked to the input signal frequency.

4 Claims, 2 Drawing Sheets

SEMICONDUCTOR OPTICAL HETERODYNE DETECTOR

BACKGROUND OF THE INVENTION

1. Field of the Invention

This invention relates generally to optical telecommunications and data transmission systems, and more particularly to optical demodulation including devices for optical heterodyning in a single semiconductor structure.

2. Background of the Invention

Coherent detection of modulated optical signals provides a significant theoretical advantage over direct detection with respect to the amount of optical power required to maintain a required error rate. In practice, it is difficult to achieve the potential benefits of coherent detection for several reasons. First, coherent detection requires the use of a spectrally pure local oscillator laser running at a frequency displaced from the signal frequency by an amount equal to the desired intermediate frequency. Secondly, the wavefront of the signal wave and the local oscillator wave must be matched to less than a small part of the optical wavelength over the beam falling on the sensative area of a photodetector. Finally, the alignments in position and frequency must be carefully maintained over time for proper operation. These practical problems are formidable, and have delayed the wide acceptance of coherent laser communications.

In the telecommunications field the benefits of coherent detection are sufficiently attractive such that efforts to design practical systems have gone forward. For example, by injecting the received signal and the local oscillator through a fiber coupler, the wave front matching condition can be automatically satisfied, and the problem of alignment stability overcome. However, a laser oscillator, fiber coupler and detector are still required, and no preamplification is obtained.

SUMMARY OF THE INVENTION

There is disclosed in this invention an optical heterodyning semiconductor structure that performs all of the necessary functions in a single device. In addition, significant preamplification gain is obtained, as well as, a phase-locked oscillating mode for providing a fixed offset frequency difference to the input optical signal.

BRIEF DESCRIPTION OF THE PREFERRED EMBODIMENT

Figure 1:
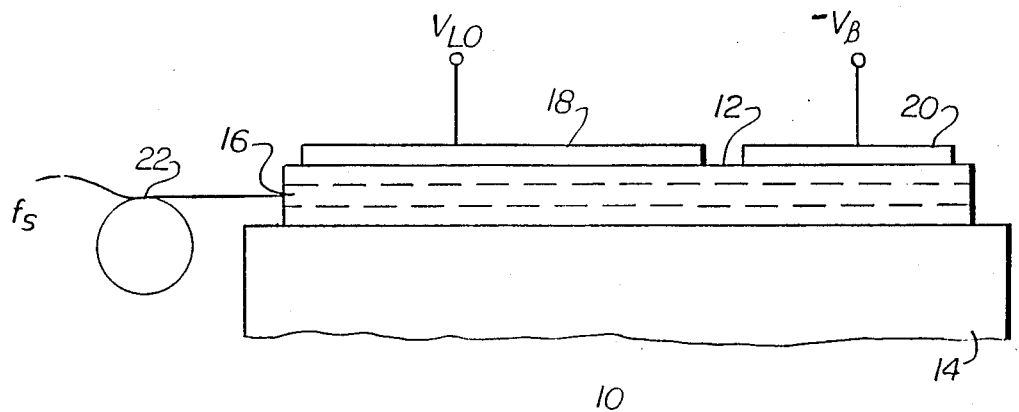
FIG. 1 illustrates a side view of a semiconductor laser structure incorporating the principles of this invention.
Figure 2:
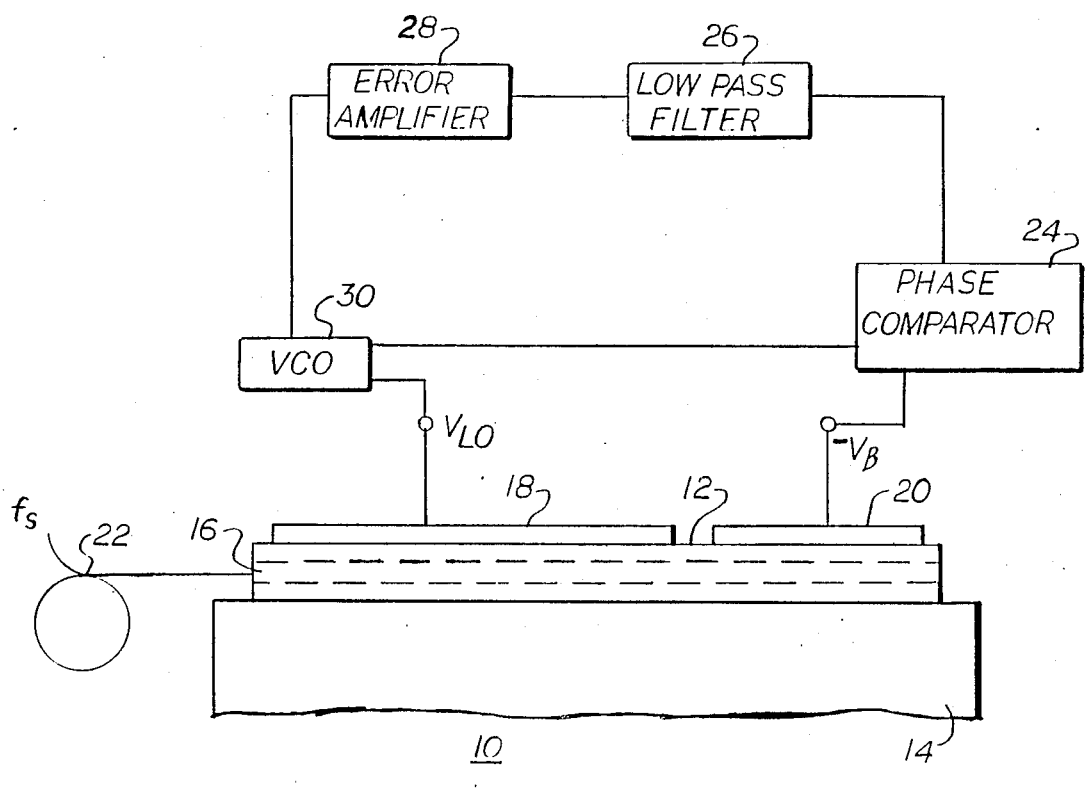
FIG. 2 illustrates a side view of a semiconductor laser structure incorporating a phase locked loop oscillating modes.

Referring to FIG. 1 there is shown a laser structure 10 comprising a semiconductor heterostructure 12 mounted upon a heat sink 14. The heat sink 14 is comprised of sufficient thermocooling materials well known in the art and also provides mechanical support and a common electrical ground for the laser structure 10. The semiconductor heterostructure 12 may be any of several types generally known in the art that comprise an active layer, ie., a region 16 where radiated recombination of electrons and holes occurs which is located between two cladding layers to provide carrier and optical field confinement. These structures have design characteristics wherein the current density at which the semiconductor device begins to omit coherent light is controlled.

The regenerative heterodyne detector consists of a semiconductor laser oscillator cavity with two separately contacted electrode sections. The first 18 covers most of the length of the cavity. The second 20 covers a short section preferrably near one end of the cavity. The received light input signal $f_s$ is injected into the opposite end of the laser cavity, using either an external lens system or by butt coupling with a single optical fiber 22. The large electrode 18 is forward biased to provide the gain required to sustain oscillation. The small section 20 is reverse biased sufficiently to act as a optical mixer, which detects an output current consisting of a dc component and an ac component at the intermediate frequency $I_f$. The injected optical signal $f_s$ experiences optical gain as it passes back and forth in the laser cavity, with levels from 3 db to 20 db. The detector electrode 20 must be short by comparison to the wavelength of the highest intermediate frequency component, but this restriction will pose no practical limitations since a 50 micrometer section would accommodate a few hundred gegahertz bandwidth. The reverse biased level should be high enough to achieve a high intermediate frequency signal level, but not quince the oscillation. This condition will be satisfied with a 600 micrometer cavity length with a grinsch laser material using a 5 micrometer ribbed waveguide 16, and applying a negative 2 volt biased on a 25 micrometer detector electrode at the end of the cavity.

Since the resonant frequency of a laser cavity shifts with drive current by an amount on the order of 1 GHZ/mA, the intermediate frequency $I_f$ can be compared to a reference signal using a phase sensitive detector. The phase comparator 24 compares the output signal at the detector electrode 20 to the voltage controlled oscillator VCO frequency $F_O$ and generates an error output voltage which is related to the phase and frequency difference. By using a low pass filter 26 and DC inverting amplifier 28 to supply a correction signal to the voltage controlled oscillator, the oscillating mode supplied to the laser cavity can be phase locked to the input optical signal with a fixed offset frequency difference. Such a capability is valuable where large doppler shifts occur, for example in laser radar and satellite laser communications.

Figure 3:
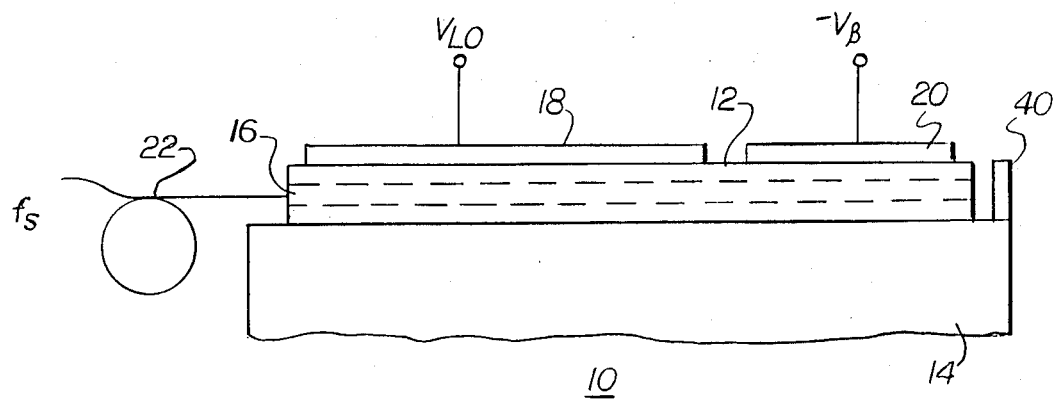
FIG. 3 illustrates a side view of a semiconductor laser structure incorporating an etalon section.

FIG. 3 illustrates a regenative heterodyne detector incorporating the principles of this invention, where the laser can be run in a single longitudinal mode for lower noise levels. This is achieved by using external etalon section 40, spaced at the end of the heterostructure 12. This can also be achieved by placing an air gap between the input fiber 22 and the laser structure 12.

It can readily be seen that there is provided by this invention a novel optical heterodyning device that provides optical frequency mixing and preamplification in a single semiconductor structure.

Although there has been illustrated and described specific detail and structure of operation, it is clearly understood that the same were merely for purposes of illustration and that changes and modifications may be readily made therein by those skilled in the art without departing from the spirit and the scope this invention.

What is claimed is:

1. A semiconductor laser heterodyne detector, comprising:
   (a) a semiconductor heterostructure means for generating optical radiation having connected thereto an optical signal input;
   (b) forward biasing means for applying a variable voltage to a first electrode section covering approximately the length of a laser cavity of the semiconductor heterostructure to generate optical radiation that mixes with the optical input signal frequency creating an intermediate frequency;
   (c) reverse biasing means for applying a reverse biased voltage to a second electrode covering a short section of the cavity of the semiconductor heterostructure means to detect an output current consisting of ac and dc components at the intermediate frequency.

2. A semiconductor laser heterodyne detector as recited in claim 1 further comprising a phase locked loop means connected between the reverse biasing means and the forward biasing means for phase locking an oscillating voltage to the optical input signal.

3. A semiconductor laser heterodyne detector as recited in claim 1 further comprising means connected to the semiconductor heterostructure means for operating the semiconductor heterostructure means in a longitudinal mode for lower noise levels.

4. A semiconductor laser heterodyne detector as recited in claim 3 wherein the means for operating the semiconductor heterostructure in a longitudinal mode comprises using external etalon section, mounted a predetermined distance from an end of the heterostructure.

* * * * *